Patented Dec. 10, 1935

2,023,928

UNITED STATES PATENT OFFICE 2,023,928

CHROME YELLOW COLOR

Ekbert Lederle and Max Guenther, Ludwigshafen-on-the-Rhine, Germany, assignors to General Aniline Works, Inc., New York, N. Y., a corporation of Delaware No Drawing. Application October 10, 1932, Serial No. 637,206. In Germany October 17, 1931

5 Claims. (Cl. 134—67)

The present invention relates to chrome yellow colors which are stable to light and to a process of producing such colors.

The usual chrome yellow colors which consist of mixed crystals of lead chromate and lead sulphate, have only a limited fastness to light; even after short exposure to sunlight they become appreciably blackened.

We have now found that chrome yellow colors of excellent stability to light are obtained by precipitating a material comprising lead chromate, crystallized in rhombic crystals, preferably together with one or more other salts crystallized in rhombic crystals and capable of forming with lead chromate an isodimorphous series of mixed crystals and of being converted into a monoclinic modification, and heating the said material while suspended in an aqueous medium at temperatures above the conversion point at which conversion into the monoclinic modification occurs until a practically complete conversion into the monoclinic modification has taken place. The salts forming an isodimorphous series of mixed crystals with lead chromate, crystallizing in rhombic crystals when precipitated under ordinary conditions and convertible into a monoclinic modification are lead sulphate and the chromates and sulphates of barium, strontium and calcium. By the usual precipitation of the mixed crystals, rhombic crystals are first obtained which can be converted into a monoclinic modification. The latter has a considerably greater fastness to light than the corresponding product in the rhombic crystal form. The colors containing moderate proportions, i. e. up to about 10 per cent, of the above mentioned alkaline earth metal salts have an improved strength of color compared with the materials free from these salts. This is especially valuable as in this way the expensive lead salts may be partly replaced by cheaper materials without decreasing the desired effect. The colors have beautiful pure shades which are superior to those of the usual lead chromate colors or their mixtures with heavy spar having the same degree of fastness to light.

The conversion temperature depends on the composition of the mixed crystals. The speed of conversion increases with increasing temperature and greater degree of dispersion of the precipitate; in the absence of water it is practically nil; the influence of the pH value will be discussed below. Generally speaking high values of pH diminish the speed of the conversion.

The precipitate of rhombic crystals which is formed originally has a very small volume and a high speed of sedimentation, while the monoclinic crystals forming long needles have a great volume and a very small speed of sedimentation. In some cases the sedimentation volume of the converted products amounts up to 20 times the sedimentation volume of the rhombic product.

The conversion by heating may be effected in water or in the aqueous liquid in which the precipitate has been formed. In this case alkali metal salts will be present if the precipitate has been produced by the interaction of lead nitrate or lead chloride and alkali metal sulphate and chromate. Free acids will be present if alkali metal bichromate or sulphuric acid are employed in the production of the precipitate.

It is preferable to move the crystals mechanically, for example by stirring, during the conversion.

It is a great advantage of the colors obtained according to the present invention that they are perfectly uniform throughout the whole mass; they are uniformly monoclinic; the mixed crystals are moreover chemically perfectly uniform.

The process according to the present invention may be carried out for example as follows:—

The mixed crystals, for example mixed crystals of lead chromate and lead sulphate, are precipitated in the usual manner, for example from lead nitrate, alkali metal sulphate and alkali metal chromate, preferably at low temperatures, these temperatures may lie above the conversion point because in any case mixed crystals of the rhombic system are formed. When the precipitation is completed, the precipitate is heated in aqueous suspension, for example suspended in the aqueous liquor from which it has been precipitated to a temperature above the conversion point, a temperature above the conversion point being maintained until all the rhombic mixed crystals have been quantitatively converted into the monoclinic modification. The conversion may be readily followed under a microscope because the rhombic crystals are granular while the monoclinic crystals are in the form of long needles. The conversion is completed as soon as grains are no longer visible under the microscope; the time necessary for the conversion is from 2 to 10 hours depending on the working conditions. In some cases it is preferable to carry out the conversion in the presence of extenders, as for example alumina hydrate or baryta, whereby a specially intimate admixture of the extenders with the pigment takes place.

By way of example the following table shows the conversion points in degrees centigrade for mixed crystals of different proportions of lead chromate and lead sulphate; below the said temperatures, the mixed crystals are stable in the rhombic form and above the said temperatures they are stable in the monoclinic form.

| Molecular percentage of lead sulphate | Conversion point |
|---|---|
| Per cent | |
| 20 | 3° |
| 40 | 10° |
| 55 | 21° |
| 70 | 39° |
| 80 | 70° |

While the lower limit of the operative temperature is given by the conversion point at which the conversion into the moleclinic modification begins to proceed it may be stated that usually the conversion will be carried out with good effect at temperatures between about 40° and 50° C. Of course, higher and also lower temperatures may be used according to the special conditions and desired effect in each case.

It is most advantageous to effect the precipitation of the colors at concentrations of the hydrogen ions at which the precipitate has the maximum or nearly the maximum sedimentation volume after being converted into the moloclinic modification. This rule is based on the observation that the products are the faster to light and stronger in color the greater the sedimentation volume of the precipitate after the conversion and that this sedimentation volume is dependent on the hydrogen ion concentration. The hydrogen ion concentration most favorable for the precipitation must be determined in each case by a number of experiments. The said concentration is dependent on the proportion of the initial materials used. If a chrome yellow consisting of 55 molecular per cent of lead chromate and 45 molecular per cent of lead sulphate is produced by the use of bichromate and sulphuric acid as precipitating agents the best results are obtained if about 0.40 to 0.45 gram mol. of acid are used for the precipitation of 1 gram mol. of the coloring matter in 50 liters of water. If smaller amounts of acid are present during the precipitation the sedimentation volume of the final, completely converted, product is only somewhat smaller, its strength of color is substantially inferior but its fastness to light is nearly equal to that of the completely converted product which has been precipitated under the optimal conditions indicated above. If greater amounts of acid are present during the precipitation the sedimentation volume decreases rapidly.

It is advantageous to use lead salt solutions having the same hydrogen ion concentration as the precipitating agent to be used so that pH is constant during the precipitation. Hereby an entirely uniform product is obtained. The most favorable conditions (hydrogen ion concentration) determined by preliminary experiments with small amounts of the reagents may be transferred without any difficulty to the production on a technical scale.

Coatings prepared with chrome yellow colors obtained according to this invention show no blackening even after exposure to sunlight for several weeks. Furthermore the products have the advantage that they undergo no change during the drying while those prepared by the usual methods thereby acquire an undesirable shade of color and harden in an unfavorable manner.

The following examples will further illustrate the nature of this invention but the invention is not restricted to these examples. The parts are by weight.

*Example 1*

A solution of 33.8 kilograms of lead nitrate in 500 liters of water is precipitated at about 15° C. with a solution of 2.9 kilograms of potassium bichromate, 3.9 kilograms of potassium chromate and 8.7 kilograms of potassium sulphate in 500 liters of water. The precipitate is allowed to settle, the supernatant mother liquor is decanted and the whole made up to about 2000 liters with hot water. The whole is heated to about 60° C. and kept at this temperature for about two hours while stirring. At the end of this period a complete conversion of the granular precipitate into long needle-shaped crystals has taken place. The crystals are filtered off, washed in the usual manner and dried. A brilliant greenish chrome yellow is obtained which is extremely fast to light.

Instead of carrying out the conversion for 2 hours at 60° C., it may be carried out at 25° C. in which case about 10 hours are necessary.

*Example 2*

A solution of 33.8 kilograms of lead nitrate in 500 liters of water is precipitated at ordinary temperature with a solution of 15.5 kilograms of potassium chromate and 3.5 kilograms of potassium sulphate in 500 liters of water. When the precipitation is completed, the mother liquor together with the precipitate is heated to about 50° C. by leading in steam and is kept at this temperature until the complete conversion of the granular crystals into the needle-shaped monoclinic modification has been established under a microscope. The conversion requires from about 4 to 5 hours. After filtering, washing and drying the precipitate, a reddish chrome yellow having excellent fastness to light is obtained.

*Example 3*

Yellow color of the composition $$Pb_{0.9}Sr_{0.1}(Cr_{0.5}S_{0.5})O_4$$

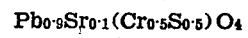

A solution of 120 parts of lead nitrate and 10.8 parts of crystallized strontium chloride in 2000 parts of water is precipitated in the sourse of ½ hour by adding gradually a solution of 38.8 parts of potassium chromate and 28.8 parts of sodium sulphate in 2000 parts of water. Then the mixture is heated up to 30° to 50° C. by leading in steam. This temperature is maintained until the whole precipitate has been converted completely into the monoclinic modification which can be easily observed by means of the microscope. The precipitate is then washed and dried in the usual manner.

*Example 4*

Yellow color of the composition $$Pb_{0.7}Sr_{0.3}CrO_4$$

47 parts of lead nitrate and 16.5 parts of strontium chloride are dissolved in 1500 parts of water and precipitated by the addition of a solution of 38 parts of potassium chromate in 1000 parts of water while stirring. Then the conversion of the precipitate into the monoclinic modification is effected by warming to 50° C.

*Example 5*

Yellow color of the composition $$Pb_{0.8}Ba_{0.2}(Cr_{0.6}S_{0.4})O_4$$

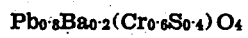

In the course of ½ hour a solution of 11.65 parts of potassium chromate and 5.8 parts of 98 per cent sodium sulphate in 1000 parts of water is added to a solution of 27 parts of lead nitrate and 5 parts of barium chloride (BaCl₂.2H₂O) in 1500 parts of water. Then the mixture is heated by leading in steam up to 60° C. This temperature is maintained until the precipitate is practically completely converted into the monoclinic modification.

*Example 6*

Chrome yellow having the composition: 55 per cent of lead chromate and 45 per cent of lead sulphate.

A solution of 338 grams of lead nitrate or 226 grams of lead chloride in 30 liters of water is precipitated by means of a solution of 107 grams of potassium monochromate, 20 grams of concentrated sulphuric acid and 36 grams of 98 per cent sodium sulphate in 20 liters of water while stirring vigorously in the course of ½ hour. By leading in steam the mixture is heated to about 50° C. This temperature is maintained for one hour and stirring is continued. The precipitate fills a volume of 40 liters; it is filtered off and dried. A very strong greenish yellow having good fastness to light is obtained.

*Example 7*

Chrome yellow having the composition: 45 per cent of lead chromate and 55 per cent of lead sulphate.

A solution of 675 grams of lead nitrate in 30 liters of 0.015 normal hydrochloric acid is precipitated by means of a solution of 175.8 grams of potassium chromate and 137 grams of 98 per cent sodium sulphate in 20 liters of 0.015 normal sulphuric acid in the course of ½ hour. The whole mass is heated up to 50° C. by means of steam and the stirring is continued at this temperature for an hour. Water is added until the whole mixture amounts to 100 liters. The precipitate fills a volume of 95 liters. By filtering off and drying a greenish chrome yellow is obtained having an excellent strength of color and fastness to light.

*Example 8*

Chrome yellow having the composition: 75 per cent of lead chromate and 25 per cent of lead sulphate.

A solution of 338 grams of lead nitrate in 15 liters of a 0.02 normal hydrochloric acid is precipitated by the addition of a solution of 146 grams of potassium chromate and 36 grams of 98 per cent sodium sulphate in 10 liters of a 0.02 normal hydrochloric acid in the course of ½ hour. The mixture obtained is then heated by means of steam up to about 40° C. and stirring is effected at this temperature for 1½ hours. After adding water until the whole mixture amounts to 50 liters, the precipitate fills a volume of 45 liters. If the precipitation is carried out in a 0.04 normal acid solution, the volume of the precipitate is only 20 liters and in a 0.06 normal solution only 2½ liters. After filtering off and drying at 100° C. a pure yellow product is obtained having a good fastness to light and a great strength of color.

*Example 9*

Yellow color of the composition

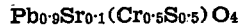

$Pb_{0.9}Sr_{0.1}(Cr_{0.5}S_{0.5})O_4$

A solution of 1200 grams of lead nitrate and 108 grams of strontium chloride (SrCl₂.6H₂O) in 20 liters of 0.015 normal hydrochloric acid is precipitated in the course of ½ hour by adding a solution of 388 grams of potassium chromate and 268 grams of 98 per cent sodium sulphate in 20 liters of 0.015 normal sulphuric acid. The reaction mixture is stirred for a further ½ to 1 hour at ordinary temperature and then filled up to 50 liters. The precipitate is filtered off and dried. The product obtained is a chrome yellow of great strength of color, of good fastness to light and a very clear shade.

If the conversion is carried out at elevated temperature it proceeds more rapidly.

If the strontium chloride is replaced by the equimolecular proportion of calcium chloride a product of similar properties is obtained.

*Example 10*

Lead chromate.

675 grams of lead nitrate are dissolved in 30 liters of 0.02 normal hydrochloric acid. This solution is precipitated by means of a solution of 388 grams of potassium monochromate in 20 liters of 0.02 normal hydrochloric acid in the course of ½ hour at 10° to 20° C. Then the reaction mixture is heated to 40° C. for 2 hours while stirring. The color obtained is filtered off and dried.

What we claim is:

1. The process of producing chrome yellow colors stable to light, which comprises precipitating a material comprising neutral lead chromate and at least one salt crystallized in rhombic crystals, capable of forming with lead chromate an isodimorphous series of mixed crystals and capable of being converted into a monoclinic modification, and heating the said material suspended in an aqueous medium at a temperature above the conversion point at which conversion into the monoclinic modification occurs until said conversion is practically complete.

2. The process of producing chrome yellow colors stable to light, which comprises precipitating a material comprising neutral lead chromate and at least one salt selected from the group consisting of lead sulphate and the chromates and sulphates of barium, strontium and calcium, crystallized in rhombic crystals, and heating the said material suspended in an aqueous medium at a temperature above the conversion point at which conversion into the monoclinic modification occurs until said conversion is practically complete.

3. The process of producing chrome yellow colors stable to light, which comprises precipitating a material comprising neutral lead chromate crystallized in rhombic crystals and heating the said material suspended in an aqueous medium at a temperature above the conversion point at which conversion into the monoclinic modification occurs, until said conversion is practically complete, while effecting the aforesaid precipitation in the presence of such amounts of acids that the precipitate converted into the monoclinic modification has nearly the maximum sedimentation volume.

4. The process of producing chrome yellow colors stable to light, which comprises precipitating a material comprising neutral lead chromate crystallized in rhombic crystals and heating the said material suspended in an aqueous medium at a temperature above the conversion point at which conversion into the monoclinic modification occurs, until said conversion is practically complete, while maintaining during the aforesaid precipitation a constant concentration of the hydrogen ions at which the precipitate converted into the monoclinic modification has nearly the maximum sedimentation volume.

5. Chrome yellow colors, being chemically uniform, of uniform monoclinic crystal form and stable to light, comprising neutral lead chromate and at least one salt selected from the group consisting of lead sulphate, and the chromates and sulphates of barium, strontium and calcium.

EKBERT LEDERLE.
MAX GUENTHER.